United States Patent [19]

Happel

[11] 4,014,301
[45] Mar. 29, 1977

[54] EXTERNALLY IGNITED INTERNAL COMBUSTION ENGINE WITH IGNITION CHAMBER

[75] Inventor: Robert Happel, Waiblingen-Bittenfeld, Germany

[73] Assignee: Daimler-Benz Aktiengesellschaft, Germany

[22] Filed: Apr. 14, 1975

[21] Appl. No.: 567,945

[30] Foreign Application Priority Data

Apr. 17, 1974 Germany ............................ 2418475

[52] U.S. Cl. ........................ 123/32 SP; 123/32 ST; 123/32 AE
[51] Int. Cl.² .................... F02B 19/10; F02B 19/16
[58] Field of Search ... 123/32 AL, 140 MP, 139 AE, 123/32 ST, 32 SP

[56] References Cited
UNITED STATES PATENTS

| | | | |
|---|---|---|---|
| 2,018,159 | 10/1935 | Walker | 123/32 SP |
| 2,310,773 | 2/1943 | Fuscaldo | 123/32 AE |
| 2,667,153 | 1/1954 | Bensinger | 123/140 MP |
| 2,688,926 | 9/1954 | Links | 123/140 MP |
| 3,017,873 | 1/1962 | Dietrich | 123/32 AL |
| 3,799,140 | 3/1974 | Vogelsang | 123/32 SP |
| 3,807,369 | 4/1974 | Yagi | 123/32 SP |

*Primary Examiner*—Ronald B. Cox
*Attorney, Agent, or Firm*—Craig & Antonelli

[57] ABSTRACT

An internal combustion engine with applied ignition which includes at least one main combustion space and one ignition chamber coordinated to a respective main combustion space and connected therewith by way of an overflow channel and provided with a spark plug and an injection valve, and a fuel supply system for the ignition chamber independent of the fuel supply for the main combustion spaces which operates in such a manner that a fuel quantity is injected into the associated ignition chamber during a low pressure phase of the corresponding main combustion space; an electromagnetically actuatable valve which is electrically controllable in accordance with the ignition sequence of the internal combustion engine is thereby coordinated to each injection line whereby the electric control of the actuating magnets of the electromagnetically actuated valves takes place by way of a switch actuated by a cam rotating at a speed proportional to the engine rotational speed; the switch, in turn, is adapted to be changed in its spacing to the cam surface to thereby change the amount of fuel injected into the ignition chamber.

24 Claims, 4 Drawing Figures

EXTERNALLY IGNITED INTERNAL COMBUSTION ENGINE WITH IGNITION CHAMBER

The present invention relates to an internal combustion engine with external auto-ignition or applied ignition having at least one main combustion space and one ignition chamber each associated with a respective main combustion space which is connected therewith by way of an overflow channel and is provided with a spark plug and an injection valve, as well as a fuel supply system for the ignition chambers independent of the fuel supply of the main combustion spaces designed at least within the larger output range according to the principle of quality control in such a manner that a fuel quantity is injected into the associated ignition chamber during a low pressure phase of the respective main combustion space whereby an electromagnetically actuatable valve electrically controllable according to the ignition sequence of the internal combustion engine is coordinated to each injection line.

Such internal combustion engines are known as such (German Offenlegungsschrift 2,307,017). One generally aims in connection with such engines at a mixture quality in the ignition chamber which lies as close as possible to the stoichiometric ratio and which is load-independent of the mixture quality in the main combustion space prepared in dependence on the load. This requires that during the operating periods of the partial load, i.e., when a relatively lean mixture is present in the main combustion space, additionally a fuel quantity depending on the ignition chamber size and on the mixture quality, i.e., on the deficiency to the stoichiometric mixture quality, has to be supplied to the ignition chamber. The after injection quantity for the ignition chamber must therefore be changed oppositely analogous to the load condition of the engine.

With the known ignition chamber injection system, a constantly flowing partial fuel stream is created for each working space of the engine which is interrupted in each case suddenly and for a short period of time at the requisite injection moment. A quantity is injected at the injection valve by the pressure shock which starts as a result thereof upstream of the closure valve. However, only an injection quantity which remains approximately constant over the rotational speed or output range can be produced with this prior art arrangement. A variation of the injection quantity approximately according to the aforementioned requirements is not available in the prior art system with acceptable expenditures.

It is the aim of the present invention to indicate a control of the ignition chamber injection while avoiding electronic controls, by means of which the injection quantity is adapted to be influenced in a highly sensitive manner as a function of load. Starting with the aforementioned internal combustion engine, the underlying problems are solved according to the present invention in that the valve respectively arranged at an ignition chamber is constructed as electromagnetically actuatable valve and in that the electric control of the actuating magnets of the valves takes place by way of a switch which is actuated by a cam rotating at a speed proportional to the engine rotational speed and which is variable in its distance to the cam surface.

Owing to the construction of the injection valve as an electromagnetically actuatable valve, it is accessible with proper design to a highly sensitive control as regards the opening period by mechanical means by way of the energizing current for the actuating magnet whereby the suitable construction of the valve may be realized in any conventional manner forming no part of the present invention and therefore not described in detail herein. Owing to the change in spacing of the switch to the actuating cam, the contact duration and therewith the closure time of the switch or the opening period of the valve is adapted to be influenced.

In order to satisfy the requirements of a mixture formation in the ignition chamber which is always approximately stoichiometric and independent of load, it is appropriate if the change in distance of the switch takes place as a function of load in such a manner that with an increasing load the corresponding electromagnetically actuated injection valves which are controlled by the switch, are opened for shorter periods of time.

Since the energizing currents for the injection valves are supplied by the low voltage power supply of the vehicle, the number of the moved or displaced contact places per each line connection must be as small as possible. It is therefore advantageous if a separate switch is coordinated to each injection valve and if these switches are circumferentially arranged uniformly distributed in the sequence of the ignition sequence of the engine about the axis of rotation of the cam.

It is customary in engine construction to interrupt at the moment of the ignition the high voltage ignition current on the low voltage side by means of a cam-actuated interrupter switch. It is purposeful according to the example of this proved structural element to provide also for the instant purposes a switch having a fixed contact and a contact movable by the cam and provided with a cam follower member, whereby the movable contact is displaced in the direction toward the cam surface in the closing sense and is under spring prestress in this sense. In order to be able to use such interrupters also for the purpose of the present invention, it is appropriate if the cam includes over about 290° to about 320° of its circumference, a uniform raised cam portion lifting the movable contact from the fixed contact, and if the cam includes within the area of the remaining cam circumference an essentially V-shaped cam recess or notch deflecting the movable contact toward the fixed contact. The distance change is thereby advantageously so constructed that with an increasing load at least the fixed contact of the switch or of the switches is adjustable in the direction toward the cam surface. Appropriately, the cam may be arranged on the ignition distributor shaft and the switches within the ignition distributor housing. This offers the advantage that with the introduction of the present invention into already existing engine constructions, few parts have to be changed. The adjustment can thereby take place in that a rotatably supported adjusting member which is operatively connected with the load adjusting lever of the internal combustion engine and which uniformly adjusts or displaces the switches during rotation, is arranged concentrically to the axis of rotation of the cam.

In order to be able to shorten the injection periods in the ignition chamber at slow engine rotational speeds and within the lower partial load range in which the air/fuel mixture is influenced quantitatively by means of a throttle valve, it is appropriate if a vacuum box or the like, operatively connected with the suction pipe downstream of the throttle valve, is arranged in the flow of power of the adjusting linkage for the switch adjustment which is held by spring force in one extreme position and is adapted to be moved away from this extreme position by vacuum in such a manner that with an increasing vacuum the switches are displaced in the direction toward smaller closing periods.

It may happen that the engine comes to a standstill in such a phase position after turning off the engine that the switch in the power supply to one of the injection valves is just closed. If in such an engine position the ignition current and therewith the power supply of all loads at the engine were to be turned on, without starting the engine, for example, during certain servicing or control operations at the vehicle, then the injection valve in question would be kept opened continuously and fuel would run continuously into the ignition chamber. In order to avoid this, it is advantageous if a switch in the form of a rotational speed monitor is provided in the power supply of the electromagnets of the injection valves which during engine standstill opens and closes during rotation of the engine shaft.

This rotational speed monitor may be constructed as a centrifugal switch arranged in the distributor shaft and connected by way of slip rings with fixed connections. Normally, internal combustion engines include a lubricating pump driven by the engine shaft which supplies the lubricating oil to the consumption places. An oil control lamp, an oil pressure indicator or the like is provided for safety reasons within the field of vision of the operating person which is turned on by an oil pressure switch and is turned off with a sufficient oil pressure. It would mean a particular saving if one were to utilize this oil pressure switch as rotational speed monitor for the injection system. This can take place in that a switch which closes in the presence of oil pressure and which is otherwise open, is provided in the oil pressure switch and in that this switch is incorporated or interconnected into the energizing circuit to the electromagnets of the injection valves and thus serves as rotation monitor.

Accordingly, it is an object of the present invention to provide an internal combustion engine with applied ignition and with an ignition chamber separate from the respective main combustion chamber but connected thereto, which avoids by simple means the aforementioned shortcomings and drawbacks encountered in the prior art.

Another object of the present invention resides in an internal combustion engine with external auto ignition and with an ignition chamber in which a variation of the injection quantity is possible to approach a mixture quality in the ignition chamber which is near the stoichiometric ratio independently of the load.

A further object of the present invention resides in an injection system for an internal combustion engine of the type described above in which a variation of the injection quantity is feasible to achieve a mixture quality in the ignition chamber which approaches the stoichiometric ratio at all loads, by simple means which avoid costly electronic controls.

A still further object of the present invention resides in a control system for an internal combustion engine with applied ignition and ignition chamber which permits a highly sensitive mechanical control of the injection quantity into the ignition chamber.

Another object of the present invention resides in an injection control system for internal combustion engines with externally applied ignition and ignition chambers which is simple in construction and involves a minimum of changes to adapt the same to existing engine constructions.

A further object of the present invention resides in an internal combustion engine of the type described above which is simple in construction, safe in operation and control and relatively inexpensive to manufacture and assemble.

These and further objects, features and advantages of the present invention will become more apparent from the following description when taken in connection with the accompanying drawing which shows, for purposes of illustration only, one embodiment in accordance with the present invention, and wherein.

Figure 1:
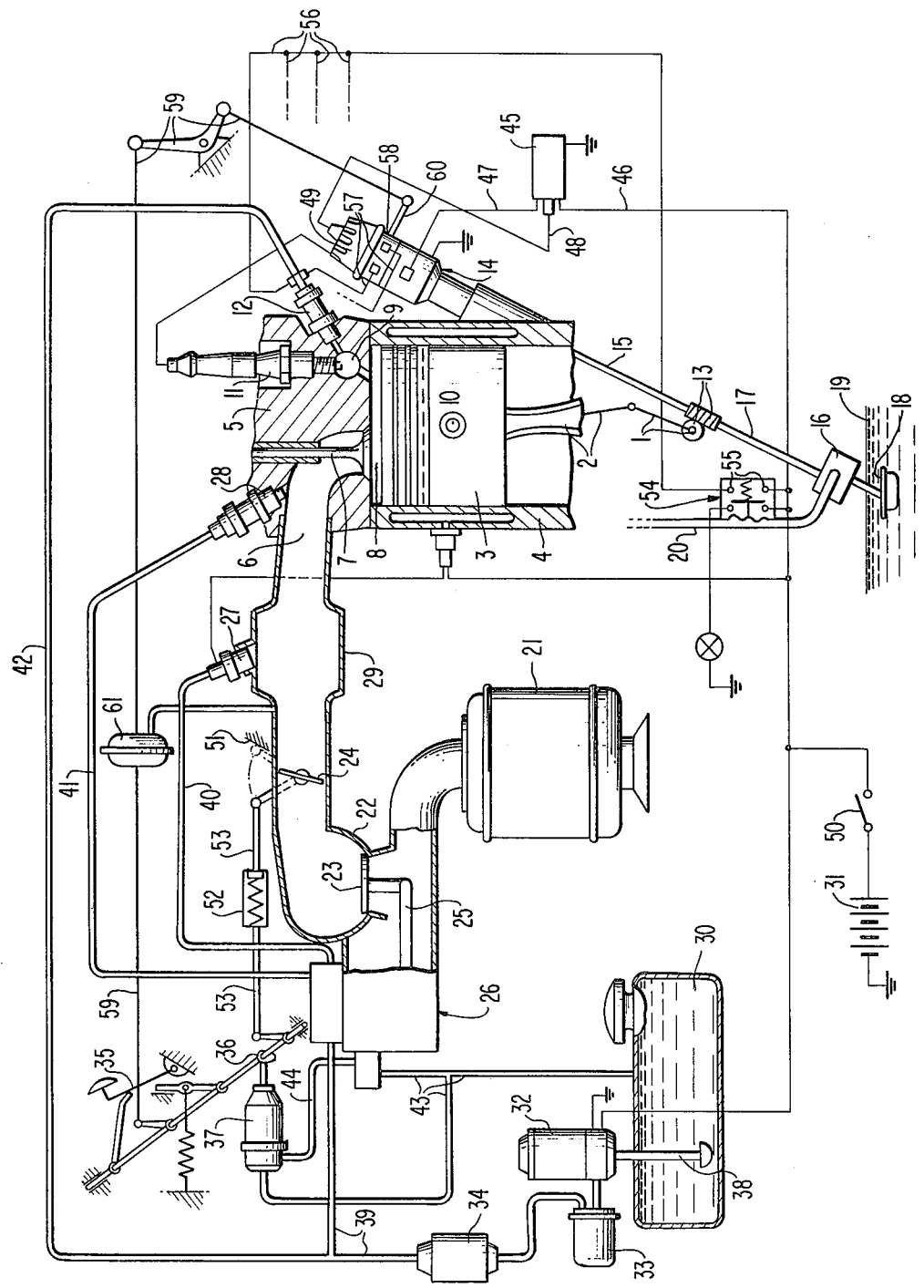
FIG. 1 is a schematic view of the fuel injection system for an internal combustion engine with externally applied ignition in accordance with the present invention.

Referring now to the drawing wherein like reference numerals are used throughout the various views to designate like parts, and more particularly to FIG. 1, a multi-cylinder internal combustion engine is schematically indicated in this figure which includes a crankshaft 1, a connecting rod 2, a piston 3, a water-cooled engine block 4, a cylinder head 5, a suction channel 6 with a suction valve 7, a main combustion space 8, an ignition chamber 9 with an overflow channel 10, a spark plug 11 arranged at the ignition chamber 9, and an ignition chamber injection valve 12. Additionally, the distributor generally designated by reference numeral 14 driven by way of a worm gear drive 13 with a transmission ratio of 1:2 belongs to the engine, which includes the distributor shaft 15, whereby the lubricating oil pump 16 is also connected with its pump shaft 17 to the distributor shaft 15. The lubricating oil pump 16 sucks the lubricating oil out of the pump sump 19 by way of the suction line 18 and forces the same into the feed line 20 of the lubricating oil system of the engine.

The mixture preparing system of the internal combustion engine includes the following main components: an air filter 21, an air quantity measurement funnel 22 with a baffle disk or plate 23, an air throttle valve 24, a conventional fuel quantity controller generally designated by reference numeral 26 and influenced by the baffle disk lever 25, a starter injection nozzle 27, a main injection nozzle 28, a common suction pipe or suction manifold 29, a fuel tank 30, a fuel supply pump 32 driven electrically from the power supply (accumulator 31), i.e., independently of the internal combustion engine, a pressure reservoir or tank 33, a fuel filter 34, a conventional fuel pressure controller 37 adapted to be influenced from the gas pedal 35 in dependence on the load by way of cams 36 as well as the corresponding connecting lines, namely the suction line 38, the feed line 39, the starter injection line 40, the main injection 41, the ignition chamber injection line 42, the return line 43 and the pressure control line 44.

The installation for the ignition of the mixture include the ignition coil 45 with the primary connections 46 and 47 and the secondary or high voltage connection 48, the already mentioned interrupter 14 driven from the crankshaft 1 of the engine with the distributor 49 and the spark plug 11 as well as the ignition starter switch 50.

By reason of the gasoline pump which is driven independently of the engine, a pre-pressure is always present in the fuel system. During the operation of the engine the baffle disk 23 and the lever 25 are more or less strongly lifted depending on the air quantity per time unit as a result of the constant sucking-in of air and correspondingly more or less fuel is injected at the main injection valve 28 into the suction line 6 depending on the lever position by reason of the fuel quantity controller 26. The injection pressure is also varied by the fuel pressure controller 37 which is more or less strongly influenced depending on the pedal position. The injection nozzle constantly injects fuel into the suction line. This mixture preparation involves essentially a quality control. This is so as the throttle valve 24— apart from the lower output range--is opened completely up to the abutment 51; when further depressing the gas pedal, the throttle linkage 53 is able to shorten itself owing to the lost motion member 52. Exclusively in the lower load range in which the throttle valve 24 is not yet completely opened and permits a more or less strong vacuum to be produced in the intake manifold 29 downstream of the throttle valve depending on the throttle position, the mixture preparation is constructed as quantity control for reason of achieving a minimum ratio in the air fuel mixture.

For an effective and complete ignition of this load-dependent more or less rich mixture in the main combustion space 8 from the ignition chamber 9, an approximately stoichiometric mixture is necessary in the ignition chamber 9 and the gasoline proportion which is missing therefor, has to be after-injected according to the indication of the ignition chamber volume and of the air/fuel ratio. This takes place by the electromagenetically actuatable and mechanically controllable injection valve 12. The injection valves 12, with increasing load, are connected for ever shorter periods of time with the power supply in dependence of the load by way of cam actuated switches, i.e., are opened for shorter periods of time and thus with increasing load a smaller fuel quantity is injected.

The current energization of the solenoid or magnet member of the injection valve 12 takes place with a closed ignition switch 50 and with a closed pair of working contacts 55 of the oil pressure switch generally designated by reference numeral 54 by the battery 31 by way of the current energizing line 56 leading to each injection valve and by way of the return lines 57 leading from each valve 12 to the interrupter housing 14. The possibility is created in the interrupter housing 14 by the insertion or incorporation of the switch member 58 to electrically connect with ground a respective return line 57 during the respective suction stroke of the associated piston over a predetermined load-dependent time interval and to open the corresponding injection valve for such length of time. The oil pressure switch 54 serves as rotational speed monitor of the engine in the current supply of the injection valves 12, which has the task to prevent that with an engaged or turned-on ignition, i.e., with switch 50 closed, but with a standing-still engine, one of the injection valves is continuously opened by reason of an accidental certain standstill position of the engine and fuel is thereby injected. The switch member 58 is provided with an adjusting lever 60 operatively connected with the gas pedal 35 by way of the linkage 59, which depending on the position of the gas pedal 35 changes the engaging or closing periods of the cam actuated switches arranged in the switch member and closed for a more or less long period of time in dependence on the load. By the use of a vacuum box 61 or the like, a load influence from the vacuum side can also be exerted within the range of the quantity control, i.e., with an at least partially closed throttle valve 24.

Figure 2:
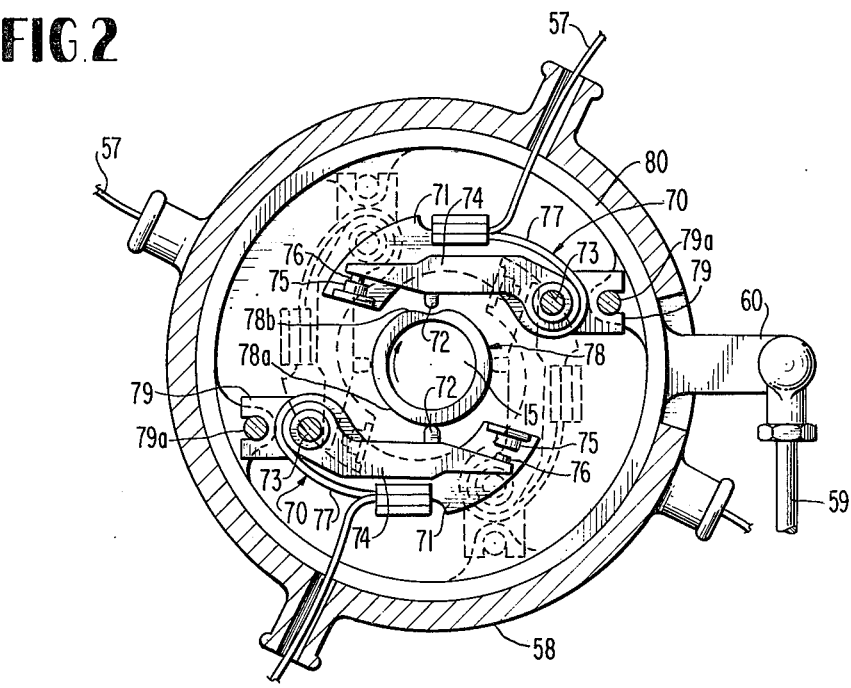
FIG. 2 is a cross-sectional view, on an enlarged scale, through the distributor housing containing the control switches for the ignition chamber injection in accordance with the present invention.

The switch member illustrated in cross section in FIG. 2 includes in the illustrated embodiment four switches generally designated by reference numeral 70 constructed according to the principle of the so-called interrupted switches, of which two are indicated in full lines and two in dash lines because they are arranged below the base plate fixed in the housing. The switches 70 include a fixed contact member 71 which is electrically connected with the ground and a movable switch member 74 which is electrically insulated with respect to ground is pivotal about the shaft 73 and is equipped with a cam follower finger 72, the fixed contact member 71 and the movable contact member 74 are each provided respectively with a fixed switch contact 75 and a movable switch contact 76. The movable switch contact 76 is pressed in the direction toward the fixed contact switch 75 by a leaf spring 77 which serves simultaneously also as current conductor and is connected respectively with a line 57. The cam generally designated by reference numeral 78 which is arranged on the shaft 15 rotating at half the crankshaft rotational speed lifts the cam follower finger 72 along approximately three quarters of its circumference, i.e., within the area of the constant, raised portion 78a of the cam, so that the switches 70 are opened. Only within the area of the V-shaped cam recess or notch 78b, the movable contact 76 is lowered for a short period of time onto the fixed contact 75. The entire switch 70 is also pivotal about the shaft 73 and engages with a fork 79 over a retaining and adjusting bolt 79a which in its turn is arranged at the adjusting ring 80 connected with the lever 60 and can be changed in its position according to the indication of the gas pedal position; more particularly the adjusting ring 80 is displaced in the clockwise direction when reducing the load or power output and in the counterclockwise direction when increasing the load or power output. As a result thereof, the switches 70 are moved radially away from the cam 78 by means of the cam follower finger 72 when reducing the load, and are moved toward the cam when increasing the load. With a large spacing of the switch 70 from the cam 78, the follower finger 72 can be lowered only slightly when passing through the V-shaped notch 78b, until the contacts 75 and 76 come in contact with each other, and the arcuate length between the two flank points of the V-shaped notch, at which the follower finger no longer follows the cam contour and again follows the same, is relatively long with a spaced away switch; the closure time of the switch and the period of engagement of the associated injection valve are correspondingly long. This closing period can be reduced by radially approaching the switch 70 toward the cam 78 by reason of a pivot movement about the shaft 73.

Figure 4:
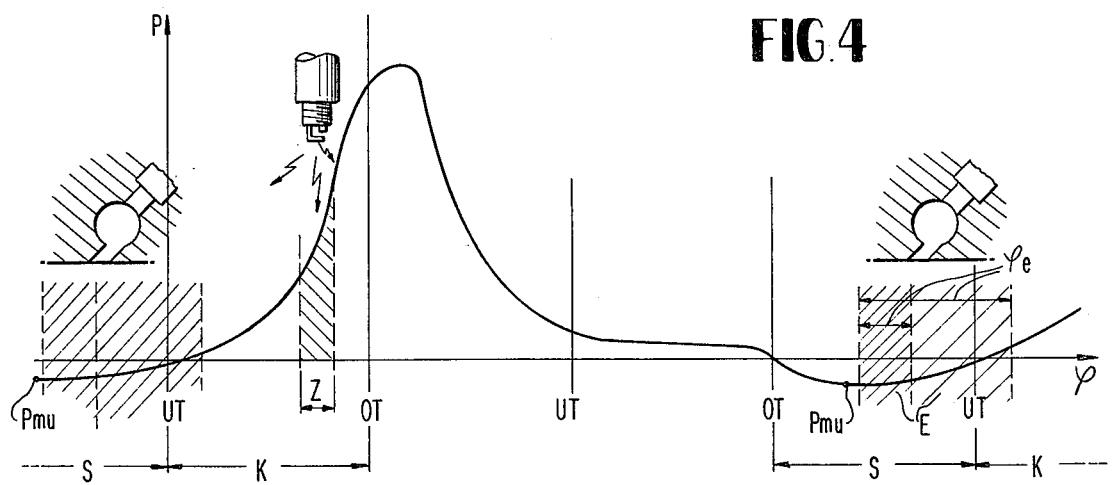
FIG. 4 is a pressure-crankshaft angle diagram of the engine in accordance with the present invention.

As the pressure-/crankshaft angle-diagram ($p$-/$\phi$-diagram) of FIG. 4 illustrates, the injection E into the ignition chamber 9 indicated by a cross hatching takes place during the suction stroke and commences only when the vacuum in the working space has reached its maximum $p_{mu}$. It is assured thereby that during the injection and over the compression stroke up to the ignition no volume particles can escape out of the ignition chamber. The injection duration $\phi_e$ depends on the load and is the longer the smaller the load. The injection beginning lies approximately in the center of the suction stroke S and lasts depending on injection duration up to the beginning or even up to the center of the adjoining compression stroke K. The range Z, within which the ignition point can move, is indicated with a cross section and an ignition spark.

Figure 3:
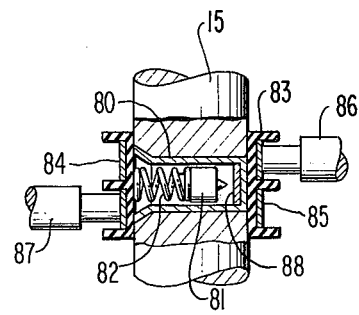
FIG. 3 is a partial elevational view, partly in cross section, of one embodiment of a centrifugal switch operable as rotational speed monitor for the engine.

A centrifugal switch serving as rotational monitor in replacement for the oil pressure switch 54 is additionally illustrated in FIG. 3, which may be possibly installed into the distributor shaft 15. A weight 81 is slidably suspended somewhat eccentrically to the shaft center at a drawspring 82 which extends to the other side of the eccentricity of the weight and is mounted in an insulated manner within a cross bore of the distributor shaft 15 on the inside of a sleeve 80 consisting of electrically insulating material. A small contact plate 88 is mounted at the bottom of the sleeve 80. The drawspring 82 is electrically connected with the weight 81. A ring 83 of insulating material with two circumferential grooves is slipped over the shaft and is secured within the area of the sleeve 80. A slip ring 84 and 85 is mounted in the bottom of a respective groove, which can be connected with feed lines (not shown) fixed at the housing by way of carbon brushes 86 and 87. The slip ring 84 is electrically connected with the small contact plate 88 and the other slip ring 85 is electrically connected with the spring 82.

As a result of the rotation of the shaft 15, the flyweight 81 is displaced toward the small contact plate 88 in the sense of the eccentricity against the force of the drawspring 82 by reason of the centrifugal force and a short circuit is established between the two slip rings 84 and 85. The two slip rings would have to be connected into the current energization 56 of the injection valves 12 in lieu of the two contacts 55 of the oil pressure switch 54.

While I have shown and described only one embodiment in accordance with the present invention, it is understood that the same is not limited thereto but is susceptible of numerous changes and modifications as known to those skilled in the art and I therefore do no wish to be limited to the details shown and described herein but intend to cover all such changes and modifications as are encompassed by the scope of the appended claims.

I claim:

1. An internal combustion engine with applied ignition which includes an ignition distributor housing means, an ignition distributor shaft, at least one main combustion space means and one ignition chamber means each coordinated to a respective main combustion space means and connected therewith by way of an overflow channel means, the ignition chamber means being provided with a spark plug means and an injection valve means, a fuel supply means for supplying fuel to the main combustion space means including control means for controlling the quality of fuel supplied to the main combustion space means over a relatively large load range of the internal combustion engine, a further fuel supply means for supplying fuel to the ignition chamber means independent of the fuel supply means for the main combustion space means, said further fuel supply means is operable so as to inject a fuel into the associated ignition chamber means during a low pressure phase of the corresponding main combustion space means, said further fuel supply means including injection line means and electromagnetically actuatable valve means coordinated to the injection line means and electrically controllable according to the ignition sequence of the internal combustion engine, characterized in that the injection valve means arranged at an ignition chamber means includes an actuating magnet means, the electric control of the actuating magnet means takes place by way of a separate switch means coordinated to each injection valve means, a cam means is arranged on the ignition distributor shaft and rotates at a speed proportional to the engine rotational speed for actuating said switch means, all of said switch means are arranged in the ignition distributor housing means circumferentially substantially uniformly distributed in the sequence of the ignition sequence of the engine about the axis of rotation of the cam means, each of the switch means includes a fixed contact means and a movable contact means movable by the cam means and provided with a cam follower means, the movable contact means being displaced in the direction toward the cam surface in the closing sense and being under a spring prestress in the closing direction, the cam means includes over about 290° to 390° of its circumference a substantially uniform raised cam portion lifting the movable contact means from the fixed contact means by engagement with the cam follower means and is provided within an area of the remaining cam circumference with an approximately V-shaped notch enabling the movable contact means to drop onto the fixed contact means, each of said switch means is variable in its spacing to the cam surface by a switch adjusting means such that a change in the distance of the switch means takes place as a function of a load of the engine in such a manner that with an increasing load the corresponding injection valve means electromagnetically controlled by the corresponding switch means is open for a shorter period of time, the switch adjusting means is so constructed that with an increasing load, at least the fixed contact means of the switch means is adjustable in a direction toward the cam surface, the switch adjusting means is rotatably supported concentrically to the axis of rotation of the cam means and is operatively connected with a load adjusting lever of the internal combustion engine such that said switch adjusting means uniformly adjusts the switch means during rotation of the switch adjusting means, and in that a vacuum operated means is arranged in the flow of power of an adjusting linkage for the switch adjusting means, which is held in one extreme position by a spring force and is adapted to be moved away from said extreme position by vacuum, said vacuum means being operatively connected with a suction pipe downstream of a throttle valve in such a manner that with an increasing vacuum, the switch means are displaced in the direction toward smaller closing periods.

2. An internal combustion engine with applied ignition which includes at least one main combustion space means and one ignition chamber means each coordinated to a respective main combustion space means and connected therewith by way of an overflow channel means, the ignition chamber means being provided with a spark plug means and an injection valve means, a fuel supply means for supplying fuel to the main combustion space means including control means for controlling the quality of the fuel supplied to the main combustion space means over a relatively large load range of the internal combustion engine, a further fuel supply means for supplying fuel to the ignition chamber means independent of the fuel supply means for the main combustion space means, said further fuel supply means is operable so as to inject a fuel quantity into the associated ignition chamber means during a low pressure phase of the corresponding main combustion space means, said further fuel supply means including injection line means and injection valve means coordinated to the injection line means and electrically controllable according to the ignition sequence of the internal combustion engine, characterized in that the injection valve means arranged at an ignition chamber means is constructed as an electromagnetically actuatable valve means having an actuating magnet means, the electric control of the actuating magnet means takes place by way of a switch means actuated by a cam means rotating at a speed proportional to the engine rotational speed, said switch means being variable in its spacing to the cam surface by a switch adjusting means, and in that an adjusting linkage is provided for adjusting the switch adjusting means, a vacuum operated means is arranged in the adjusting linkage, the vacuum operated means includes a vacuum responsive element and a spring means for holding the vacuum responsive element in one extreme position, said vacuum operated means being operatively connected with a suction pipe means downstream of a throttle valve means whereby the vacuum acts upon the vacuum responsive element to move the same from the extreme position such that, with an increasing vacuum, the adjusting linkage displaces said switch adjusting means so as to displace said switch means in a direction toward smaller closing periods.

3. An internal combustion engine according to claim 2, characterized in that one separate switch means is coordinated to each injection valve means, all of said switch means being arranged circumferentially substantially uniformly distributed in the sequence of the ignition sequence of the engine about the axis of rotation of the cam means.

4. An internal combustion engine according to claim 2, with an ignition distributor housing means and an ignition distributor shaft, characterized in that the cam means is arranged on the ignition distributor shaft and the switch means are arranged in the ignition distributor housing means.

5. An internal combustion engine according to claim 2, characterized in that the switch adjusting means is rotatably supported concentrically to the axis of rotation of the cam means and is operatively connected with a load adjusting lever of the internal combustion engine, said switch adjusting means uniformly adjusting the switch means during the rotation.

6. An internal combustion engine according to claim 2, with an oil pressure switch means actuated by the system pressure of the lubricating oil system of the internal combustion engine, characterized in that a switch is provided in the oil pressure switch means which closes in the presence of an oil pressure and is otherwise opened, and in that this said switch serves as rotational speed monitor.

7. An internal combustion engine according to claim 2, in which the switch means includes a fixed contact means and a movable contact means movable by the cam means and provided with a cam follower means, the movable contact means being displaced in the direction toward the cam surface in the closing sense and being under a spring prestress in this sense, characterized in that the cam means includes over a large part of its circumference a substantially uniform raised cam portion lifting the movable contact means from the fixed contact means by engagement with the cam follower means and being provided within the area of the remaining cam circumference with an approximately V-shaped notch enabling the movable contact means to drop onto the fixed contact means.

8. An internal combustion engine according to claim 7, characterized in that the large part of the circumference extends over about 290° to about 320°.

9. An internal combustion engine according to claim 7, characterized in that the switch adjusting means adjusting the distance of the switch means is so constructed that with an increasing load, at least the fixed contact means of the switch means is adjustable in the direction toward the cam surface.

10. An internal combustion engine according to claim 2, characterized in that a switch is provided in the energizing circuit of the magnet means of the injection valve means which opens during engine standstill and closes during engine shaft rotation.

11. An internal combustion engine according to claim 10, characterized in that the last mentioned switch means operates as a rotational speed monitor.

12. An internal combustion engine according to claim 11, characterized in that the rotational speed monitor switch is constructed as centrifugal switch arranged in the distributor shaft and operatively connected with fixed connections by way of slip rings.

13. An internal combustion engine according to claim 2, characterized in that the change in distance of the switch means to the cam surface takes place as a function of load.

14. An internal combustion engine according to claim 2, characterized in that the change in distance of the switch means takes place as a function of load in such a manner that with an increasing load the corresponding injection valve means electromagnetically controlled by the corresponding switch means is opened for a shorter period of time.

15. An internal combustion engine according to claim 14, characterized in that one separate switch means is coordinated to each injection valve means, all of said switch means being arranged circumferentially substantially uniformly distributed in the sequence of the ignition sequence of the engine about the axis of rotation of the cam means.

16. An internal combustion engine according to claim 15, in which the switch means includes a fixed contact means and a movable contact means movable by the cam means and provided with a cam follower means, the movable contact means being displaced in the direction toward the cam surface in the closing sense and being under a spring prestress in this sense, characterized in that the cam means includes over a large part of its circumference a substantially uniform raised cam portion lifting the movable contact means from the fixed contact means by engagement with the cam follower means and being provided within the area of the remaining cam circumference with an approximately V-shaped notch enabling the movable contact means to drop onto the fixed contact means.

17. An internal combustion engine according to claim 16, characterized in that the large part of the circumference extends over about 290° to about 320°.

18. An internal combustion engine according to claim 17, characterized in that the switch adjusting means adjusting the distance of the switch means is so constructed that with an increasing load, at least the fixed contact means of the switch means is adjustable in the direction toward the cam surface.

19. An internal combustion engine according to claim 15, with an ignition distributor housing means and an ignition distributor shaft, characterized in that the cam means is arranged on the ignition distributor shaft and the switch means are arranged in the ignition distributor housing means.

20. An internal combustion engine according to claim 19, characterized in that the switch adjusting means is rotatably supported concentrically to the axis of rotation of the cam means and is operatively connected with a load adjusting lever of the internal combustion engine, said switch adjusting means uniformly adjusting the switch means during the rotation.

21. An internal combustion engine according to claim 20, characterized in that a switch is provided in the energizing circuit of the magnet means of the injection valve means which opens during engine standstill and closes during engine shaft rotation.

22. An internal combustion engine according to claim 21, characterized in that the last mentioned switch means operates as a rotational speed monitor.

23. An internal combustion engine according to claim 22, characterized in that the rotational speed monitor switch is constructed as centrifugal switch arranged in the distributor shaft and operatively connected with fixed connections by way of slip rings.

24. An internal combustion engine according to claim 22, with an oil pressure switch means actuated by the system pressure of the lubricating oil system of the internal combustion engine, characterized in that a switch is provided in the oil pressure switch means, which closes in the presence of an oil pressure and is otherwise opened, and in that this said switch serves as rotational speed monitor.

* * * * *